Nov. 7, 1950     W. A. SCHULZE ET AL     2,529,355
PRODUCTION OF DIALKYL POLYSULFIDES
Filed Aug. 23, 1948
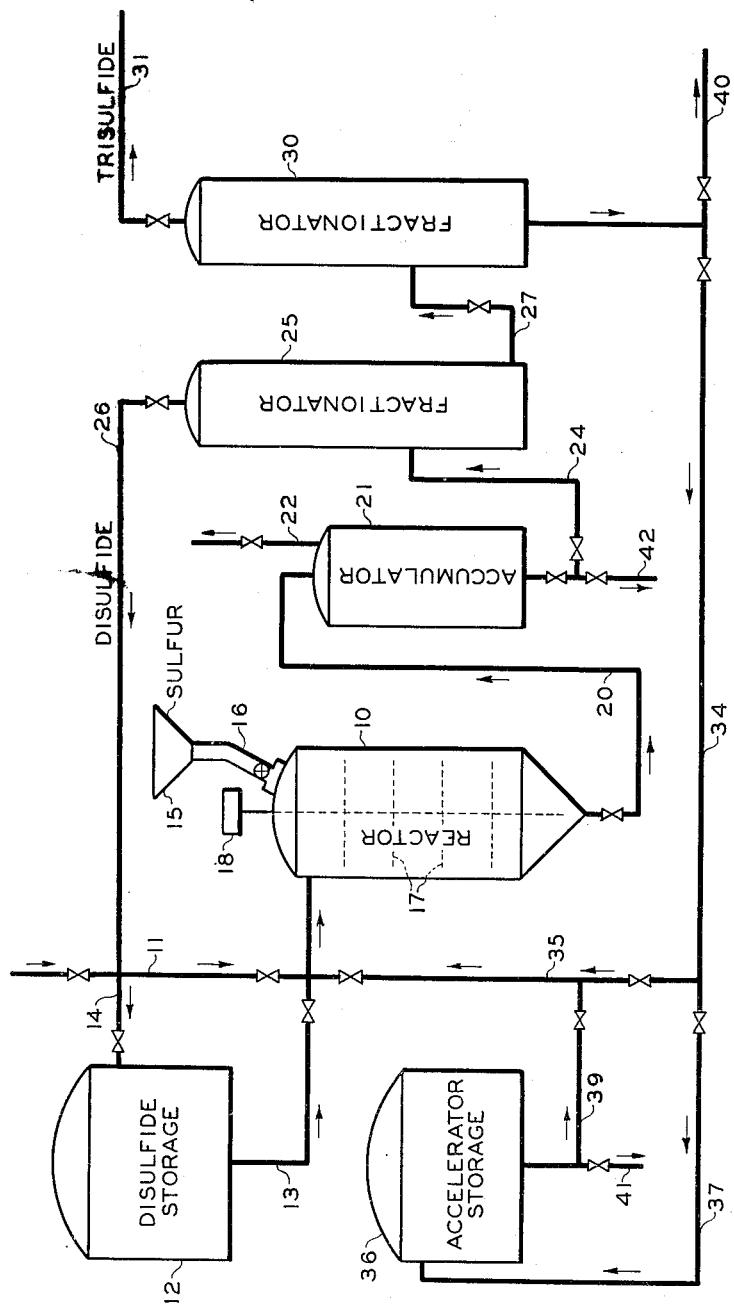
INVENTOR.
W. A. SCHULZE
W. W. CROUCH
BY *Hudson and Young*
ATTORNEYS Patented Nov. 7, 1950

2,529,355

UNITED STATES PATENT OFFICE 2,529,355

PRODUCTION OF DIALKYL POLYSULFIDES

Walter A. Schulze and Willie W. Crouch, Bartlesville, Okla., assignors to Phillips Petroleum Company, a corporation of Delaware Application August 23, 1948, Serial No. 45,604

11 Claims. (Cl. 260—608)

This invention relates to a process for sulfurizing organic compounds and more particularly relates to the sulfurization of organic polysulfides. In one of its aspects it relates to a process for the production of dialkyl polysulfides and in one of its most particular modifications to the production of dialkyl trisulfides from dialkyl disulfides.

Dialkyl polysulfides and particularly dialkyl trisulfides have been found useful for many purposes such as additives for elastomers, antioxidants, lubricating oils, intermediates for production of valuable organic chemicals, insecticides, germicides, and particularly as an additive to Diesel fuels to improve the cetane number and ignition qualities of these fuels. These compounds have also been found useful in the compounding of extreme pressure lubricants and in the acceleration of rubber treating processes.

The preparation of these compounds, however, has been a problem of considerable difficulty from an industrial standpoint. Dialkyl polysulfides have heretofore been produced by the interaction of mercaptans with sulfur monochloride or with sulfur dichloride. When this process is used the principal product is a dialkyl tetrasulfide which is converted at least partially to the trisulfide by fractionating under conditions regulated to favor such degradative conversion. An obvious disadvantage of this procedure lies in the use of the sulfur chloride, which involves additional equipment, materials, operational costs and the necessity for purifying the product, which is obtained contaminated with various byproducts. Dialkyl disulfides have been converted to polysulfides in the presence of molecular sulfur and a basic catalyst such as various organic amines. This process likewise produces a product contaminated with side-reaction products and the basic catalyst must also be neutralized before separation to obtain a pure product. This general process of combining sulfur with mono- or poly-sulfides is generally designated as sulfurization and is so defined in the present discussion and claims. Thus the previous methods of preparation while generally satisfactory have involved various operational disadvantages.

An object, therefore, of the present invention is to provide an improved process for the preparation of dialkyl polysulfides.

Another object of the present invention is to provide an improved process for the preparation of dialkyl trisulfides.

A still further object of the present invention is to describe an accelerator for the sulfurization of dialkyl polysulfides with sulfur to produce dialkyl polysulfides having at least one additional sulfur atom per molecule.

Another object is to provide a process for the sulfurization of dialkyl disulfide with sulfur to produce dialkyl polysulfides of at least one more sulfur atom per molecule.

A still further object of the present invention is to provide a process for the preparation of dialkyl trisulfides in which a product of the reaction between dialkyl disulfides and sulfur is employed as a catalytic accelerator for the production of the trisulfides.

Other objects will be apparent to one familiar with the art from the following discussion and appended drawing which respectively describes and illustrates a preferred embodiment of the invention and in which the drawing diagrammatically shows one arrangement for the practice of the invention.

We have now discovered a process for the production of dialkyl polysulfides from the interaction of sulfur with corresponding dialkyl polysulfides lower in sulfur content than that desired, wherein a substantial reduction in reaction time and increased yields are effected by the use of a novel accelerating agent. According to the method of our invention the complex heavy residue remaining after the fractionation of the effluent of a process in which sulfur is reacted with an organic sulfide, is employed as a catalytic accelerating agent to increase the reaction rate and yield of the desired polysulfide in the reaction of sulfur with the polysulfide charged to the process. The residue remaining after the removal of unreacted and mono-molecularly sulfurized organic sulfide from a reaction of sulfur with such a sulfide is particularly suitable. However, sulfurized compounds containing two or more added sulfur atoms may be separated and the remaining complex residue employed as the accelerating agent.

By employing the accelerating agent of our invention it is found that the reaction time to produce an equivalent amount of desired sulfide may be reduced by as much as 40 to 50 per cent or in some instances even more. In the usual conversion of dialkyl disulfides to corresponding trisulfides employing elemental sulfur, we have found that as much as 40 or more hours at a temperature of 300° F. may be required to effect a conversion of about 60 per cent while by the present process using the present accelerating agent a comparable conversion and yield may be obtained in about 20 to 24 hours at the same temperature. In either case, a somewhat more rapid conversion may be obtained at higher temperatures but this is undesirable since decomposition of the product takes place at these higher temperatures with a corresponding reduction in yield, and with contamination of the product.

A most desirable accelerating agent for use in converting any particular dialkyl polysulfide by our invention comprises the heavy complex mixture of material which remains unseparated after the removal of any desired conversion products and of unreacted sulfide in a reaction between sulfur and the corresponding polysulfide. For example, in preparing dialkyl trisulfide from a corresponding dialkyl disulfide, the accelerating agent may comprise the residue from a fractionation which removes the unreacted disulfide and the desired trisulfide from the conversion effluent of a reaction between the disulfide and sulfur alone. This accelerating agent may be prepared in a separate conversion operation and thereafter stored and supplied to each batch conversion as required or an initial conversion may be effected in the absence of the accelerating agent and the heavy material from this conversion and from each successive conversion cycle may be recycled to the following conversion. By the latter system, once the process has commenced and one batch of accelerating agent has been formed, the process will furnish such agent for succeeding conversions. In the preparation of an especially suitable accelerating agent for a conversion employing any particular alkyl-substituted disulfide, the dialkyl disulfide corresponding to the desired dialkyl trisulfide may be charged to a reactor and admixed with sulfur in a substantially mol for mol ratio, and heated to a temperature between 250° and 350° F., preferably between about 300° and 320° F. At this temperature the reactants form two liquid phases, one of which comprises molten sulfur and the other of which comprises a solution of sulfur in the disulfide. The reaction is maintained under sufficient pressure to retain the reactants in the liquid phase at the reaction temperature. The reactant phases are constantly agitated and thoroughly admixed, with reaction taking place between the disulfide and sulfur to produce dialkyl trisulfide and complex and heavier products. These compounds dissolve in the disulfide phase and increase its solvent power for sulfur and, as the reaction proceeds, the reaction mixture becomes homogeneous. After a reaction time of about 30–40 hours under these conditions, 50 to 70 per cent of the disulfide is converted. The reaction is discontinued and the effluent is fractionated, preferably under reduced pressure, to separately recover the unreacted dialkyl disulfide, the dialkyl trisulfide product and a heavier kettle product which is the accelerating agent of our invention. The unreacted disulfide may be returned to the feed or to storage for subsequent conversion and the trisulfide may be stored and combined with subsequent products from the process. The accelerating agent may be conveyed to storage or may be immediately returned in part or in total to a subsequent conversion, as desired.

The process of our invention is applicable to the manufacture of various dialkyl polysulfides and, under general conditions given, is particularly adaptable to the preparation of dialkyl trisulfides. The process is found to be especially adaptable to the manufacture of organic polysulfides in which dialkyl disulfides containing various alkyl groups may be converted to polysulfides. Under the preferred conditions of the process those disulfides having alkyl groups which contain one to six carbon atoms of either primary, secondary or tertiary configuration are particularly suitable. The specific conditions in the reactor will, of course, depend upon the disulfide being reacted. For example, with low boiling disulfide reactants, the reaction will be conducted under sufficient super-atmospheric pressure to maintain liquid phase conditions at the operating temperatures while, with those boiling at about the optimum reaction temperature, the reaction may be operated at substantially atmospheric pressure and with suitable reflux condensers to prevent the loss of material. When reacting higher boiling feed stocks such as di-tertiary butyl disulfide, the reaction may be conducted below the boiling point and at atmospheric pressure. Reaction temperatures between about 250° and 350° F. are desirable and an operating temperature of about 300° to 320° F. may be preferred. It is particularly desirable to maintain at least a 1:1 ratio of sulfur to disulfide and, although higher ratios may be used, no particular advantage is obtained by operating beyond about 1.5:1. The accelerating agent may be present in an amount between 20 to 60 weight per cent of the disulfide reactant present in the process and 30 to 35 weight per cent is usually satisfactory. When operating under preferred conditions of reaction time and temperature, the heavier product will usually be formed in an amount which will substantially satisfy the accelerator requirement. The mixture of disulfide, sulfur and accelerator may be reacted between 20 to 30 hours, preferably about 24 hours, per conversion cycle under the preferred conditions, although it is possible to employ a shorter reaction time with lower conversion and more frequent separation or to employ a higher reaction temperature at the expense of more loss and lower yield by decomposition and higher contamination.

The function of the accelerator is not fully understood, but apparently is of a catalytic nature. By comparison of the results under the usual method of operation in the absence of the accelerator and under the present process employing the accelerator of this invention, it is found that with the same conditions of temperature and time, the percentage of yield is increased from about 50 to 70 per cent to about 80 to 94 per cent. In a preferred manner of operation in which the heavy accelerating agent recovered from each conversion of a series of batch conversions is passed to a succeeding conversion, it is found that the conversion to desired polysulfides increases progressively for two or three conversions and then reaches a substantially constant, but increased, yield which is characteristic of those conversions in the presence of the accelerating agent. Upon the return of the accelerating agent to the reaction zone, reactant polysulfide and sulfur are added and reaction between the sulfide and sulfur is effected in the presence of the agent. A satisfactory system consisting of successive batch conversions in the preparation of trisulfides may be operated by returning to the reaction zone the unreacted disulfides and, as the accelerating agent, the entire heavy product from a preceding conversion, together with additional sulfur in an amount equivalent to that consumed in the production of the trisulfide in the preceding conversion and with sufficient new disulfide to make up a predetermined total batch charge. The amount of new disulfide required will, of course, correspond approximately to the amount of disulfide reacted in the previous conversion when operating so that a substantially constant amount of heavy product is formed. The fact that there is a substantially constant amount of heavy product or accelerating agent recovered in each batch conversion indicates that the disulfide reacted in subsequent conversion, in which the accelerating agent is added, is not being converted into these heavier compounds and complexes and that the presence of the recycled heavy product furnishes an accelerating or catalytic effect upon the reaction. This is further emphasized by the fact that there is an increase in the amount of trisulfide formed and recovered when the accelerating agent is employed, even though the amount of disulfide reacted may be about the same or in some instances lower, than by the usual method of reacting the disulfide with sulfur in the absence of any accelerating agent.

The process of the present invention may be more clearly understood by describing the preparation of a dialkyl trisulfide in connection with the accompanying figure which diagrammatically shows one satisfactory arrangement of apparatus for the operation of the present process. For any conversion or series of conversions the operation may be either conducted by first reacting the disulfide with sulfur in the absence of an accelerating agent whereby there will be heavy acelerating agent produced which may be used subsequently as desired, or the operation may be begun with accelerating agent introduced from storage into the initial conversion. To obtain comparable conversion in the initial step of the first method, the reaction may be continued 50 to 60 per cent longer during this step before removing the reactants from the reaction zone and separating the products. Referring to the figure, a dialkyl disulfide may be introduced into a reactor 10 through a line 11 or from a storage tank 12 through a line 13 which joins line 11 as shown. Disulfide may previously have been placed in the storage tank through a line 14 branching from line 11. Sulfur may be added in equimolecular proportions with the disulfide to the reactor from a source 15 through a line 16. Accelerating agent may also be introduced into the reactor from storage but assuming first an initial conversion in absence of such agent, the mixture of disulfide and sulfur is thoroughly mixed in the reactor by some means of agitation such as mixing blades 17 actuated by a motor 18. Reaction temperature between 250° and 350° F. and pressure sufficient to maintain the reactants in the liquid phase are maintained in the reactor during the conversion. The reactants are maintained under these conditions for a process period of 30 to 40 hours after which the product is removed from the reactor by a line 20 through cooling equipment which is not shown, into an accumulator 21 which stores the conversion effluent prior to separation. Light gases and decomposition products such as hydrogen sulfide, mercaptans and light olefins which are uncondensed may be removed from the accumulator through a line 22 and recovered, separated, used or disposed of as desired. From the accumulator, the products are passed by a line 24 to a fractionator 25 from which unreacted disulfide is removed overhead through a line 26 and passed to the disulfide storage tank through line 14 or returned directly to the reactor through line 11. The remaining effluent after removal of disulfide is passed by line 27 into a fractionator 30 from which the trisulfide product is removed overhead through a line 31 to further treatment, storage or other uses. The heavier product which is the accelerating agent for the present process is removed as a kettle product from fractionator 30 through line 34 and may be returned directly to the reactor through lines 35 and 11 or passed to accelerator storage 36 by a line 37. Although the product separation system has been shown as consisting of two fractionators, it will be understood that there may be more fractionating units or a single fractionator of sufficient plates to obtain the desired separation. The fractionating units will, of course, include customary heating or reboiler means and cooling and refluxing means, which have been omitted for simplicity of the drawing. The fractionation is preferably conducted under reduced pressure to minimize decomposition of products. As required, accelerator may be withdrawn from the accelerator storage by a line 39 and passed to the reactor through lines 35 and 11. The accelerator may be withdrawn from the system following the fractionation by a line 40 or from the storage through line 41 and the products of reaction may be removed from the system prior to any separation through a line 42 where desirable. As suggested above, in subsequent conversions unreacted disulfide is returned to the reactor, additional elemental sulfur is added to the reactor in an amount equivalent to that consumed in production of the trisulfide recovered in the preceding conversion and 20 to 60 per cent of the accelerator, usually the entire heavy product formed in the preceding conversion, is added to the reactor. Sufficient new disulfide is added to the reactor to bring the batch up to a predetermined total charge. The mixture of disulfide, sulfur and accelerating agent is reacted under the previous conditions but for a shorter time of about 20 to 30 hours and the product is separated as previously described. Various valves, pumps, heating and cooling elements, reflux accumulators and other conventional equipment necessary for the operation of the process as described will be obvious to those familiar with the art and have been omitted from the drawing for sake of clarity.

The improvements in yield which are obtained by operating according to the present process are readily shown in the following examples in each of which the first cycle is made in absence of any accelerating agent and in each of which the remaining cycles are conducted in the presence of the entire accelerating agent formed in the immediately preceding conversion. The reactants supplied, the disulfide reacted, and the per cent trisulfide yield of the theoretical based on the disulfide reacted is tabulated for each cycle in each of the first two examples. The information and results in Example 1 and Example 2 are combined in the single table for convenience of tabulation. The specific conditions and particular results are discussed separately under the respective examples below.

Table I

(a) EXAMPLE 1; 300° F.

| Reactant Charge ||| | | Distillation Product ||| Sulfide Reacted | Yield [1] (Per Cent TH) |
| Disulfide ||| Sulfur Added | Accelerator | Disulfide | Heavy Product | Trisulfide Yield | | |
| New | Recycle | Total | | | | | | | |
| --- | --- | --- | --- | --- | --- | --- | --- | --- | --- |
| 1,187 | | 1,187 | 213 | | 674 | 271 | 415 | 513 | 68.6 |
| 398 | 674 | 1,072 | 60 | 271 | 491 | 331 | 524 | 581 | 76.4 |
| 498 | 491 | 989 | 80 | 331 | 487 | 259 | 559 | 502 | 94.4 |
| 563 | 487 | 1,050 | 91 | 259 | 409 | 262 | 661 | 641 | 87.4 |
| 629 | 409 | 1,038 | 100 | 262 | 354 | 272 | 694 | 684 | 86.0 |
| 668 | 354 | 1,022 | 105 | 272 | 336 | 284 | 699 | 686 | 86.4 |
| 674 | 336 | 1,010 | 106 | 284 | 308 | 282 | 715 | 702 | 86.4 |
| 701 | 308 | 1,009 | 109 | 282 | 319 | 293 | 708 | 690 | 87.0 |

(b) EXAMPLE 2; 310° F.

| New | Recycle | Total | Sulfur Added | Accelerator | Disulfide | Heavy Product | Trisulfide Yield | Sulfide Reacted | Yield |
| --- | --- | --- | --- | --- | --- | --- | --- | --- | --- |
| 1,187 | | 1,187 | 213 | | 533 | 234 | 582 | 654 | 75.5 |
| 545 | 533 | 1,078 | 88 | 234 | 517 | 224 | 609 | 561 | 92.1 |
| 566 | 517 | 1,083 | 93 | 224 | 459 | 235 | 643 | 624 | 87.4 |
| 608 | 459 | 1,067 | 98 | 235 | 457 | 252 | 633 | 610 | 88.0 |
| 595 | 457 | 1,052 | 96 | 252 | 457 | 260 | 621 | 595 | 88.5 |
| 588 | 457 | 1,045 | 95 | 260 | 427 | 261 | 635 | 618 | 87.1 |
| 616 | 427 | 1,043 | 96 | 261 | 436 | 264 | 624 | 607 | 87.2 |
| 605 | 436 | 1,041 | 95 | 264 | 425 | 270 | 621 | 616 | 85.5 |

[1] Yield is per cent theoretical, based on disulfide reacted.

Example 1

In the preparation of ditertiary butyl trisulfide, an accelerating composition was first produced by inter-acting 1187 gms. of ditertiary butyl disulfide with 213 gms. of sulfur at 300° F. for 36 hours. The conversion product was fractionated at 5 mm. pressure and a reflux ratio of about 2:1 or lower to yield 674 gms. of unreacted disulfide distilling below 160° F., 415 gms. of ditertiary butyl trisulfide distilling between 185° and 195° F. and 271 gms. of high boiling accelerating agent. Less than 3 per cent of the charge was lost through decomposition of the reactants. The ditertiary butyl trisulfide produced is a clear, substantially colourless liquid having a density at 60° F. of 0.9913 gms./cc. and an index of refraction, $n_D^{20}$ of 1.5208. The accelerator formed in the initial step was combined with the recovered disulfide and 392 gms. of fresh disulfide and 60 gms. of sulfur and reacted under the same conditions with the yield of trisulfide shown in Sec. (a) of Table I. This process was repeated for a total of 8 cycles with the results shown in the table. It is readily seen that a material increase is realized in the percentage of disulfide converted to trisulfide when the reaction is conducted in the presence of the accelerating agent by comparing the percentage yield in the initial cycle in which no accelerating agent is employed with yields in each of the cycles following.

Example 2

The process of Example 1 was repeated through a series of 8 cycles with the same reactants at a temperature of 310° F. with the results shown in Sec. (b) of Table I. A comparison of the results of this example, in the absence and in the presence of accelerating agent, shows the advantages of the present invention. In each of the cycles in which the accelerating agent is present a larger yield of trisulfide is recovered from less disulfide than when the accelerating agent is absent and the percentage yield based on disulfide reacted is appreciatively larger under the preferred method of operation. In this example the first cycle (without accelerating agent) was of 36 hours duration while each of the subsequent cycles were for a shorter period of only 24 hours, but nevertheless the yield and the percentage yield of trisulfide were substantially increased during conversion for the shorter time in the presence of the accelerating agent.

Example 3

In another example under conditions similar to those of Example 1, conversion is conducted through a series of three cycles to produce ditertiary amyl trisulfide. A marked increase in the yield of trisulfide is realized when the accelerating agent from the reaction between ditertiary amyl disulfide and sulfur is employed in the conversion. In the present example in which only a total of three cycles is employed, a total of 634 gms. of ditertiary amyl disulfide and 97.3 gms. of sulfur were used to produce 500 gms. of ditertiary amyl trisulfide, which is a yellowish oil liquid having a boiling point between 210° and 215° F. at 2 mm. pressure, a density at 60° F. of 1.0027 and an index of refraction, $n_D^{20}$ of 1.5288.

The products of the present invention are exceptionally free from contaminating products inasmuch as no foreign reagents or materials are introduced into the system and reaction is substantially confined to the production of desired products. Under some conditions of recovery, the products may be contaminated by minor amounts of hydrogen sulfide and mercaptans which result from decomposition of the products. Further purification may be effected by low pressure refractionation, stripping under vacuum, caustic washing and drying, and similar conventional treatment. For many uses the degree of purity is sufficiently high for utilization of the compounds directly from the first fractionation, without more refined treatment. It has been observed that the slightly contaminated products and the accelerating agent tend to be corrosive over a period of time, especially to ordinary steel equipment and it is recommended that equipment resistant to sulfur corrosion be employed.

Inasmuch as the foregoing description comprises preferred embodiments of the invention, it is to be understood that various changes and modifications may be made therein without departing from the scope which is inherent with the invention. Likewise various related organic sulfides other than those specifically disclosed may be substituted in the process and the advantages of the process realized.

We claim:

1. An improved process for converting an organic dialkyl polysulfide into a sulfurized polysulfide having at least one more sulfur atom per molecule which comprises contacting said dialkyl polysulfide with elemental sulfur under sulfurizing conditions in the presence of a catalytic accelerating agent which consists of a complex heavy liquid residue remaining after the removal of unreacted and mono-molecularly sulfurized organic sulfide from a reaction of sulfur with such sulfide.

2. An improved process for converting an organic dialkyl polysulfide into a sulfurized polysulfide having at least one more sulfur atom per molecule which comprises contacting said dialkyl polysulfide with elemental sulfur under sulfurizing conditions in a reaction zone, separating from a resulting effluent stream unreacted dialkyl polysulfide, said sulfurized polysulfide product and a complex heavy residue, recycling said heavy residue to the reaction zone with additional dialkyl polysulfide and sulfur, and sulfurizing the dialkyl polysulfide in the presence of said heavy residue.

3. An improved process for converting an organic dialkyl polysulfide into a sulfurized polysulfide having at least one more sulfur atom per molecule which comprises contacting said dialkyl polysulfide with elemental sulfur under sulfurizing conditions in a reaction zone, separating from a resulting effluent stream unreacted dialkyl polysulfide, said sulfurized polysulfide and a complex heavy residue, recycling said unreacted polysulfide and said heavy residue to the reaction zone, introducing additional dialkyl polysulfide and elemental sulfur, and sulfurizing said dialkyl polysulfide in the presence of said heavy residue.

4. An improved process for converting an organic dialkyl polysulfide into a sulfurized polysulfide having at least one more sulfur atom per molecule which comprises contacting said dialkyl polysulfide with elemental sulfur under sulfurizing conditions in a reaction zone, separating from a resulting effluent stream unreacted dialkyl polysulfide, said sulfurized polysulfide and a complex heavy residue, recycling said unreacted polysulfide and said heavy residue to the reaction zone, introducing additional dialkyl polysulfide and elemental sulfur, sulfurizing said dialkyl polysulfide in the presence of said heavy residue, successively repeating said conversion, separation and recycling through a plurality of conversion cycles, and collecting said sulfurized polysulfide from the separation in each cycle as an aggregate product of the process.

5. An improved process for converting a dialkyl disulfide into dialkyl trisulfide which comprises reacting said disulfide with elemental sulfur under sulfurizing conditions in the presence of an added complex heavy liquid residue remaining after the removal of trisulfide and unreacted disulfide from a reaction between a dialkyl disulfide and sulfur.

6. The process according to claim 5 in which said complex residue comprises 20 to 60 weight per cent of said disulfide.

7. An improved process for converting a dialkyl disulfide in which the alkyl groups contain from one to six carbon atoms into the corresponding dialkyl trisulfide which comprises reacting said dialkyl disulfide with elemental sulfur at a temperature between 250° and 350° F., separating a resulting effluent into unreacted disulfide, said trisulfide and a complex heavy liquid residue, recycling said heavy residue and reacting additional disulfide and sulfur in presence of said heavy residue, and recovering said trisulfide from the latter reaction.

8. An improved process for converting a dialkyl disulfide in which the alkyl groups contain from one to six carbon atoms into the corresponding dialkyl trisulfide which comprises reacting said disulfide with elemental sulfur at a temperature between 250° and 350° F. and pressure sufficient to maintain liquid phase in a reaction zone, separating a resulting effluent into unreacted disulfide, said trisulfide and a complex heavy residue, recycling said heavy residue and unreacted disulfide to the reaction zone, introducing additional disulfide and sulfur, repeating the reaction, separation and recycle for a plurality of conversion cycles, and collecting the trisulfide from each conversion as the product of the process.

9. The process according to claim 8 in which the first reaction is maintained for a substantially longer time than the subsequent conversions.

10. The process according to claim 9 in which the first reaction is continued during 30 to 40 hours and each of the subsequent conversions is continued for 20 to 30 hours.

11. The process for converting dibutyl disulfide to dibutyl trisulfide which comprises reacting said dibutyl disulfide with elemental sulfur at a temperature of about 300° to 310° F. for 36 hours, separately recovering unreacted disulfide, said dibutyl trisulfide and a complex heavy residue, recycling said unreacted disulfide and said heavy residue, introducing additional disulfide and sulfur, and repeating the conversion, separation and recycle for a plurality of conversion cycles at the same temperature and for a period of about 24 hours for each conversion period.

WALTER A. SCHULZE.
WILLIE W. CROUCH.

REFERENCES CITED

The following references are of record in the file of this patent:

UNITED STATES PATENTS

| Number | Name | Date |
| --- | --- | --- |
| 2,237,625 | Olin | Apr. 8, 1941 |
| 2,237,627 | Olin | Apr. 8, 1941 |